United States Patent
Du et al.

(10) Patent No.: US 9,743,216 B2
(45) Date of Patent: Aug. 22, 2017

(54) COMMUNICATION METHOD FOR MACHINE-TYPE-COMMUNICATION AND EQUIPMENT THEREOF

(75) Inventors: Hongfei Du, China (CN); Yu Chen, China (CN)

(73) Assignee: GEMALTO SA, Meudon (FR)

( * ) Notice: Subject to any disclaimer, the term of this patent is extended or adjusted under 35 U.S.C. 154(b) by 1355 days.

(21) Appl. No.: 13/520,310

(22) PCT Filed: Jan. 5, 2010

(86) PCT No.: PCT/CN2010/070020
§ 371 (c)(1),
(2), (4) Date: Jul. 2, 2012

(87) PCT Pub. No.: WO2011/082520
PCT Pub. Date: Jul. 14, 2011

(65) Prior Publication Data
US 2012/0317242 A1    Dec. 13, 2012

(51) Int. Cl.
*H04W 4/00*    (2009.01)
*H04L 29/08*   (2006.01)

(52) U.S. Cl.
CPC ............. *H04W 4/005* (2013.01); *H04L 67/06* (2013.01); *H04L 67/141* (2013.01); *H04L 67/16* (2013.01)

(58) Field of Classification Search
CPC ...... H04W 4/005; H04L 67/16; H04L 67/141; H04L 67/06

(Continued)

(56) References Cited

U.S. PATENT DOCUMENTS

| 7,020,701 B1 * | 3/2006 | Gelvin | G01D 21/00 250/332 |
| 7,729,285 B2 * | 6/2010 | Yoon | H04W 40/10 370/254 |

(Continued)

FOREIGN PATENT DOCUMENTS

| CN | 1889441 A | * | 1/2007 | ............. H04L 12/00 |
| CN | 1889441 A |   | 1/2007 | |

(Continued)

OTHER PUBLICATIONS

Lu et al, RAP: A Real-Time Communication Architecture for Large-Scale Wireless Sensor Networks, RTAS'02 IEEE (2002).*

(Continued)

*Primary Examiner* — David Lazaro
*Assistant Examiner* — Robert Shaw
(74) *Attorney, Agent, or Firm* — Fay Sharpe LLP

(57) ABSTRACT

The present invention discloses a communication method for machine-type-communication (MTC) between a MTC server and MTC equipments, which comprises: the MTC server broadcasts a target content related to an application, receives availability information related to the target content from candidate MTC equipments which satisfy the target content, selects any one or more MTC equipments from the candidate MTC equipments based on the availability information, establishes a session connection with each of the selected MTC equipments, and receives content uploaded by the selected MTC equipments. The invention furthermore discloses a communication method for MTC between the MTC equipments and the MTC server, and discloses the corresponding MTC server and the MTC equipment.

7 Claims, 6 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 7,907,941 | B2* | 3/2011 | Twitchell, Jr. | G01S 13/825 235/462.1 |
| 8,027,280 | B2* | 9/2011 | Ganesh | G01D 21/00 370/310 |
| 8,107,397 | B1* | 1/2012 | Bagchi | H04L 9/0822 370/254 |
| 2001/0014141 | A1* | 8/2001 | Kraeutler | H04Q 11/0471 379/1.03 |
| 2005/0021760 | A1* | 1/2005 | Kim | H04L 67/42 709/227 |
| 2007/0067742 | A1* | 3/2007 | Takaoka | H04L 12/2602 715/850 |
| 2007/0078809 | A1* | 4/2007 | Semkow et al. | 707/2 |
| 2007/0165579 | A1 | 7/2007 | Delibie et al. | |
| 2007/0233822 | A1* | 10/2007 | Farmer et al. | 709/220 |
| 2008/0209026 | A1* | 8/2008 | Qi | H04L 41/0823 709/223 |
| 2008/0307109 | A1* | 12/2008 | Galloway | H04L 67/06 709/232 |
| 2009/0238182 | A1* | 9/2009 | Yanagihara | H04L 12/1854 370/390 |
| 2009/0285136 | A1* | 11/2009 | Sun | H04L 45/20 370/310 |
| 2010/0027434 | A1* | 2/2010 | Chung | H04L 41/5009 370/252 |
| 2012/0093087 | A1* | 4/2012 | Chen | H04L 45/025 370/328 |
| 2012/0106431 | A1* | 5/2012 | Wu | H04W 4/00 370/312 |

FOREIGN PATENT DOCUMENTS

| | | | | |
|---|---|---|---|---|
| CN | 101309297 | A | 11/2008 | |
| CN | 100490382 | C * | 5/2009 | |
| EP | 1835668 | A1 * | 9/2007 | ......... H04L 12/2602 |
| WO | WO2005/043847 | A1 | 5/2005 | |

OTHER PUBLICATIONS

3GPP TS 22.368 V1.1.1 Machine Type Communications (Nov. 2009).*

Lu et al RAP: Real-Time Communication Architecture for Large-Scale Wireless Sensor Networks, Proc. 8th IEEE Real-Time and Embedded Technology and Applications Symposium (RTAS'02), IEEE, 2002.*

Lu et al, RAP: A Real-Time Communication Architecture for Large-Scale Wireless Sensor Networks, Proceedings of the Eighth IEEE Real-Time and Embedded Technology and Applications Symposium (RTAS'02), IEEE, 2002.*

3$^{rd}$ Generation Partnership Project (3GPP), "Technical specification Group Services and System Aspects; Service requirements for machine-type-communications; Stage 1 (Release 10)," 3GPP TS 22.368 v1.1.1, pp. 1-23, Nov. 30, 2009.

International Search Report for PCT/CN2010/070020 dated Jun. 17, 2010.

* cited by examiner

COMMUNICATION METHOD FOR MACHINE-TYPE-COMMUNICATION AND EQUIPMENT THEREOF

TECHNICAL FIELD OF THE INVENTION

The present invention relates to machine-type communication (MTC), and particularly, to a communication method for MTC and equipment thereof.

BACKGROUND OF THE INVENTION

In general, the machine-type communication MTC is a communication between machines via a communication network, which can be applied to remote monitoring, remote measurement and the like. According to the specification of 3GPP standard TS 22.368 "Service Requirements for Machine-type Communications" (version 1.1.1), the communication between the machines is time-controlled, i.e., to communicate during an operator determined and adjustable time period only.

In existing wireless communication networks, a session initiation process usually employs one-way handshake, i.e., a network side device broadcasts a request containing a device identifier (ID) over a downlink broadcast control channel, and then an equipment matching the ID responds to the request and the network side device establishes a session connection with the equipment.

However, for the MTC, since the network side device will not care about what equipment it needs but the intended specific content, it is necessary to pre-negotiate before the normal session initiation, i.e., to determine which equipment has the intended content. With the existing session initiation process, the established session connection is based on the device ID, and when the communicating equipment becomes unable to provide the intended content, the network side device still receives the content from the equipment, thereby failing to continuously obtain the intended content.

SUMMARY OF THE INVENTION

The present invention is proposed in view of the above-mentioned technical problem, and its objective is to provide a communication method for MTC and related equipment, which can implement content-based communication and can obtain the intended content continuously.

According to a first aspect of the present invention, there is provided a communication method for MTC between an MTC server and MTC equipments, which comprises: broadcasting a target content request related to an application by the MTC server; receiving availability information related to the target content from candidate MTC equipments which satisfy the target content request; selecting any one or more MTC equipments from the candidate MTC equipments based on the availability' information; establishing a session connection with each of the selected MTC equipments; and receiving contents uploaded by the selected MTC equipments.

According to a second aspect of the present invention, there is provided a communication method for MTC between an MTC equipment and an MTC server, which comprises: receiving, by the MTC equipment, a target content request related to an application broadcasted by the MTC server; determining whether the MTC equipment satisfies the target content request; sending availability information related to the target content to the MTC server if the MTC equipment satisfies the target content request; and establishing a session connection with the MTC server in response to a session connection request from the MTC server; and uploading content onto the MTC server.

According to a third aspect of the present invention, there is provided an MTC server for MTC, which comprises: a broadcasting module configured to broadcast a target content request related to an application; a reception module configured to receive availability information related to the target content from candidate MTC equipments which satisfy the target content request; a selection module configured to select any one or more MTC equipments from the candidate MTC equipments based on the availability information; and a connection establishment module configured to establish a session connection with each of the selected MTC equipments; wherein the reception module is further configured to receive contents uploaded by the selected MTC equipments upon the establishment of the session connections.

According to a fourth aspect of the present invention, there is provided an MTC equipment for MTC, which comprises: a reception module configured to receive a target content request related to an application broadcasted by the MTC server; a determination module configured to determine whether the MTC equipment satisfies the target content request; a sending module configured to send availability information related to the target content to the MTC server if the MTC equipment satisfies the target content request; and a connection establishment module configured to establish a session connection with the MTC server in response to a session connection request from the MTC server; wherein the sending module is further configured to upload content onto the MTC server.

According to a fifth aspect of the present invention, there is provided a communication system for MTC, which comprises: the above-described MTC server; and at least one MTC equipment described above.

DETAILED DESCRIPTION OF THE PREFERRED EMBODIMENT

It is believed that the above and other objectives, features and advantages of the present invention will be more apparent through the detailed description of the specific embodiments of the present invention in conjunction with the attached drawings.

Figure 1:
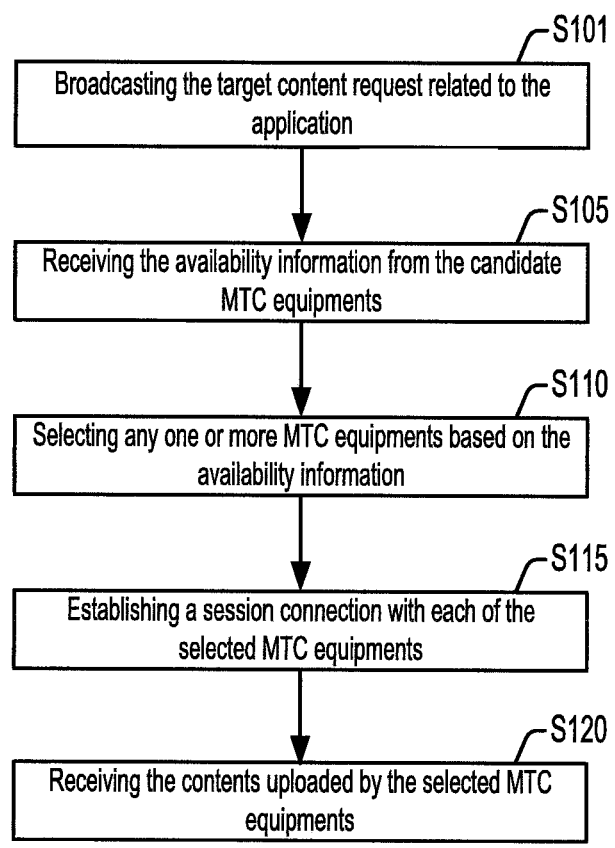
FIG. 1 is a flow chart of the communication method between the MTC server and the MTC equipments according to an embodiment of the present invention.

FIG. 1 shows a flow chart of the communication method between the MTC server and the MTC equipments according to an embodiment of the present invention. This embodiment will be described below in detail in conjunction with the figure.

In the embodiment, the MTC communication system comprises the MTC server and a plurality of MTC equipments. The MTC equipments may be located in different geographic locations, and the MTC server communicates with these MTC equipments through a communication network. The communication network may be for example, a wireless communication network such as GSM, Third Generation mobile communication network, a wired communication network, and the like. As described above, the MTC communication may be related to a certain application, such as traffic monitoring, intelligent measurement and the like. In the traffic monitoring application, the MTC server is usually located in a traffic monitoring center, while the MTC equipments may be, for example, cameras located in different locations, including fixed cameras and vehicle-mounted cameras. In the intelligent measurement application, the MTC equipments may be, for example, measurement instruments.

As shown in FIG. 1, at step S101, the MTC server broadcasts the target content request related to an application. For example, for a wireless communication network, the MTC server may broadcast over a downlink broadcast control channel. The target content may be determined according to the applications. For example, for the traffic monitoring application, the target content may be image information of a specific location area. For the intelligent measurement application, the target content may be measurement information within a data range.

Then, at step S105, the MTC server receives availability information related to the target content from at least one candidate MTC equipment which satisfies the target content request. For example, in the above-mentioned traffic monitoring application, the target content can be an image of a specific location area, then cameras located within the specific location area become the candidate cameras, and the availability information of these candidate cameras is the respective region coverage information, including GPS location, angle, distance, etc. Similarly, in the above-mentioned intelligent measurement application, the target content can be measurement information within the data range, then the measurement instruments whose measurement data is within the data range become the candidate measurement instruments, and the availability information of these candidate measurement instruments is the associated measurement data.

Then, at step S110, the MTC server selects any one or more MTC equipments from these candidate MTC equipments based on the received availability information of the candidate MTC equipments, as the MTC equipments intended to establish a session connection. The number of the selected MTC equipments may be determined according to different application requirements. For example, for the above-mentioned traffic monitoring application, only one MTC equipment can be usually selected. For the above-mentioned intelligent measurement application, multiple MTC equipments can be selected usually.

Preferably, the MTC server can select the best candidate MTC equipment. Specifically, the MTC server compares the availability information of the respective candidate MTC equipments with each other, and then selects the best MTC equipment according to the requirements of the application.

At step S115, the MTC server establishes a session connection with each of the selected MTC equipments. The establishment of the session connection is well known to those skilled in the art, so its description will be omitted here. Finally, at step S120, after the session connections are established, the MTC server receives contents uploaded by the selected MTC equipments.

It can be seen from the above description that in the communication method between the MTC server and the MTC equipments of the embodiment, the communication between the MTC server and the MTC equipments which satisfy the target content request can be based on the content by broadcasting the target content request rather than the MTC equipments' IDs, and can be independent of the equipment ID itself, so that the MTC session may contain multiple separate connections between the MTC server and the MTC equipments.

Figure 2:
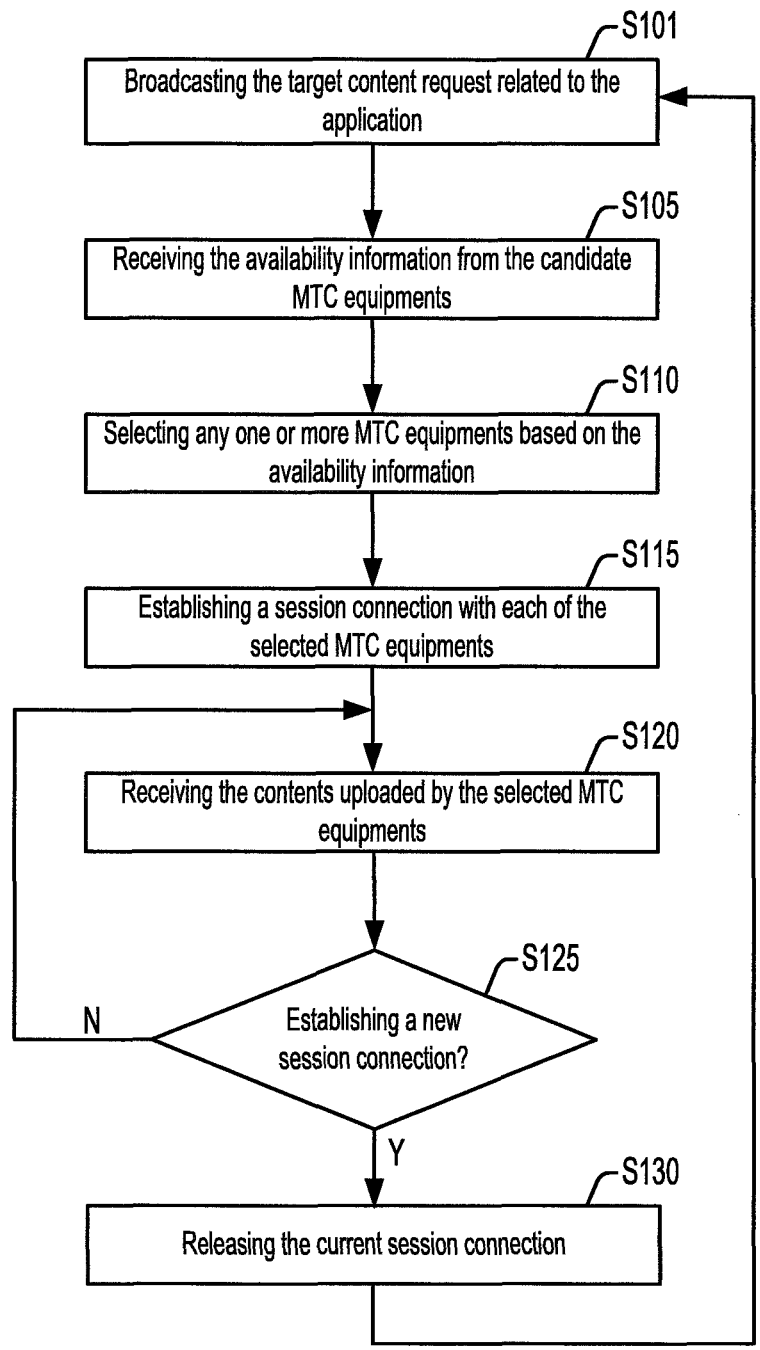
FIG. 2 is a flow chart of the communication method between the MTC server and the MTC equipments according to another embodiment of the present invention.

FIG. 2 shows a flow chart of the communication method between the MTC server and the MTC equipments according to another embodiment, wherein for the same parts as those of the previous embodiment, the same reference numbers will be used, and the description thereof will be properly omitted. This embodiment will be described below in detail in conjunction with the figure.

As shown in FIG. 2, at step S125 following the step S120, the MTC server determines whether it is needed to establish a new session connection. In this embodiment, in order to obtain the continuous contents, when the communicating MTC equipment becomes unable to provide the required target content, it is necessary for the MTC server to perform a reconnection operation to receive the required target contents from another MTC equipment which can satisfy the target content request.

In one embodiment, the MTC server checks whether the content uploaded by each of the selected MTC equipments satisfies the target content request, to determine whether the selected MTC equipment can report the intended target content. If the content uploaded by any one of the selected MTC equipments does not satisfy the target content request, the MTC server determines that it is needed to establish a new session connection; otherwise, the MTC server continues to receive the content uploaded by the MTC equipment. For example, in the traffic monitoring application, when the uploaded image is beyond the specific location area due to the rotation of the communicating fixed camera, the MTC server determines that this fixed camera cannot report the required target content and it is needed to establish a new session connection. In addition, in the example of intelligent measurement application, if the measurement information uploaded by the measurement instrument exceeds the data range, the MTC server determines that this measurement instrument cannot report the required target contents and it is needed to establish a new session connection In another embodiment, the MTC server monitors whether the information is received from any one of the selected MTC equipments indicating that this MTC equipment is unavailable, to determine whether the selected MTC equipment can report the required target contents. If the information is received, the MTC server determines that it is needed to establish a new session connection; otherwise, the MTC server continues to receive the content uploaded by the MTC equipment. In the above-mentioned example of the traffic monitoring application, if a communicating vehicle-mounted camera moves outside the location area determined by the target content request, the vehicle-mounted camera sends to the MTC server the information indicating that this camera is unavailable, and upon the reception of the information, the MTC server determines that it is needed to establish a new session connection.

Any one or both of the methods of the MTC server determining whether it is needed to establish a new session connection may be selected according to the applications.

When it is determined in step S125 that it is needed to establish a new session connection, at step S130, the MTC server releases the current session connection. Then the step S101 to step S120 are repeated, and the MTC server re-establishes a session connection with the selected MTC equipments, and receives the uploaded contents.

If it is determined that it is not needed to establish a new session connection, the MTC server continues to receive the contents from the selected MTC equipments.

It can be seen from the above description that the communication method between the MTC server and the MTC equipments of the embodiment can meet the time controlled feature of the MTC by monitoring in real time the state of the contents reported by the communicating MTC equipment and establishing a new session connection when the communicating MTC equipment is unable to report the required target contents. Moreover the MTC server may switch from an MTC equipment to another MTC equipment based on the reported contents in order to obtain continuous contents, thereby achieving the high availability of the content communication.

Figure 3:
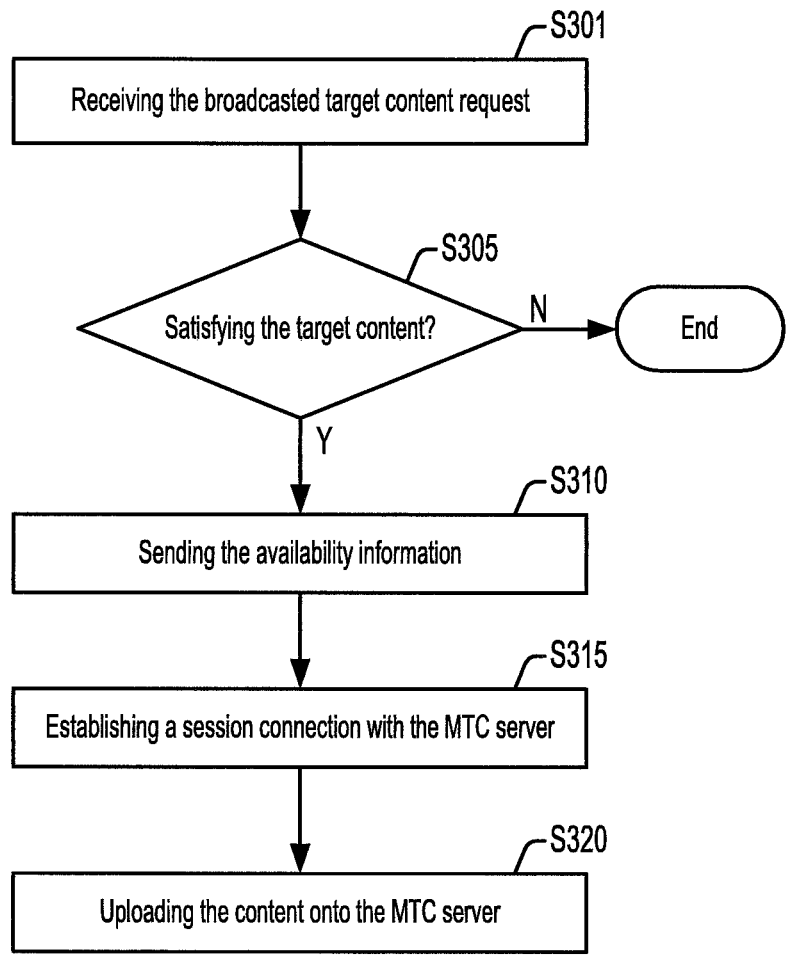
FIG. 3 is a flow chart of the communication method between the MTC equipment and the MTC server according to the embodiment of the present invention.

Under the same inventive concept, FIG. 3 shows a flow chart of the communication method between the MTC equipment and the MTC server according to an embodiment of the present invention. This embodiment will be described below in detail in conjunction with the figure, wherein for the same parts as those of the previous embodiments, the description thereof is properly omitted.

In this embodiment, the MTC communication system has the same structure as the MTC communication system in which the method of the embodiment shown in FIGS. 1 and 2 are implemented.

As shown in FIG. 3, at step S301, the MTC equipment receives the target content request request related to an application broadcasted by the MTC server. For example, the MTC server may broadcast the target content request over the downlink broadcast control channel.

Then, at step 8305, the MTC equipment determines whether it satisfies the target content request. In the above example of the traffic monitoring application, the MTC equipment determines whether it is located in a specific location area defined by the target content request. If the MTC equipment is located in the specific location area, it indicates that the MTC equipment satisfies the target content request, it indicates that the MTC equipments does not satisfy the target content request.

If it is determined in step S305 that the MTC equipment satisfies the target content request, at step S310, the MTC equipment sends its availability information associated with the target content to the MTC server. The availability information has already been described in the previous embodiments. If the MTC equipment determines in step S305 that it does not satisfy the target content request, at step S310, any processing will be performed.

Then, at step S315, if a session connection request is received from the MTC server, in response to the request, a session connection with the MTC server is established, and after the session connection is established, the contents are uploaded onto the MTC server at step S320.

It can be seen from the above description that the communication method between the MTC equipment and the MTC server of the embodiment can determine whether the MTC equipment is able to report the required target contents based on the target content request broadcasted by the MTC server, thus the communication between the MTC server and the MTC equipment is content-based.

Further, the MTC equipment constantly determines whether it satisfies the target content request during the uploading of the contents onto the MTC server. When the MTC equipment determines that it does not satisfy the target content request, it notifies during the uploading of the MTC server of the information indicating that the MTC equipment is unavailable. In this way, the MTC server can be notified timely of the unavailability of the MTC equipment, so that the MTC server can establish a new session connection to obtain the continuous contents.

Figure 4:
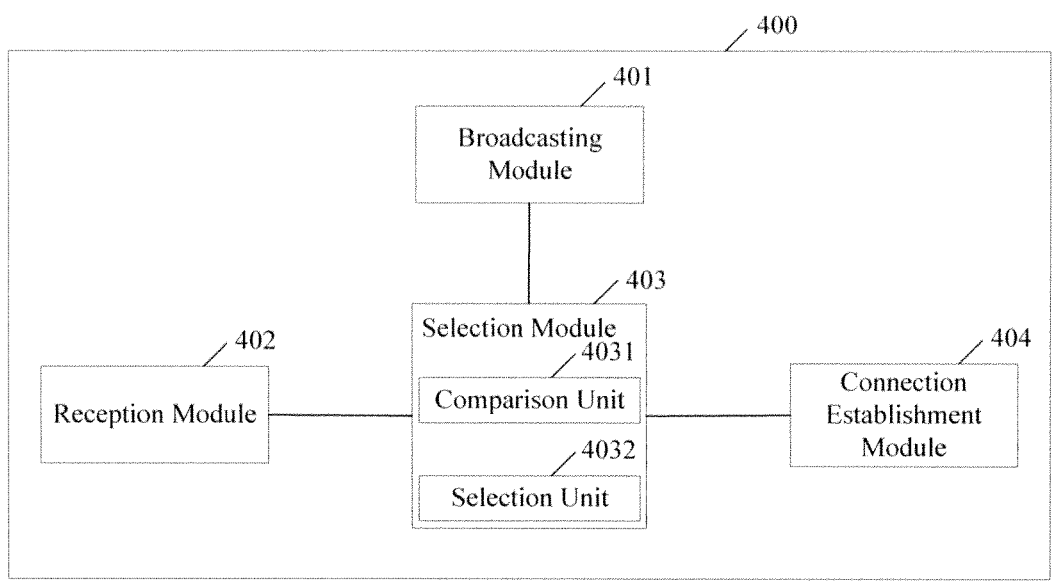
FIG. 4 is a schematic block diagram of the MTC server according to an embodiment of the present invention.

Under the same inventive concept, FIG. 4 shows a schematic block diagram of the MTC server according to an embodiment of the present invention. This embodiment will be described below in detail in conjunction with the figure, wherein for the same parts as those of the previous embodiments, the description thereof will be properly omitted.

As shown in FIG. 4, the MTC server 400 of this embodiment comprises: a broadcasting module 401, which broadcasts the target content request related to an application; a reception module 402, which receives availability information related to the target content from candidate MTC equipments which satisfy the target content request; a selection module 403, which selects any one or more MTC equipments from the candidate MTC equipments based on the received availability information; and a connection establishment module 404, which establishes a session connection with each of the selected MTC equipments; wherein the reception module 402 further receives contents uploaded by the selected MTC equipments upon the establishment of the session connections.

In the MTC server 400 of this embodiment, the broadcasting module 401 broadcasts the target content request over the downlink broadcast control channel. Then the reception module 402 receives the availability information provided by the candidate MTC equipments, and provides the availability information to the selection module 403. The selection module 403 selects any one or more MTC equipments from the candidate MTC equipments to establish the session connection In the selection module 403, comparison unit 4031 compares the availability information of the respective candidate MTC equipments with each other. Then selection unit 4032 selects the best MTC equipment according to the application requirements.

Then, via the connection establishment module 404, the MTC server 400 may establish a session connection with each of the selected MTC equipments. After the session connection is established, the reception module 402 receives the content uploaded by each of the selected MTC equipments.

It should be noted that the MTC server 400 of this embodiment can operatively implement the communication method between the MTC server and the MTC equipments of the embodiment shown in FIG. 1.

Figure 5:
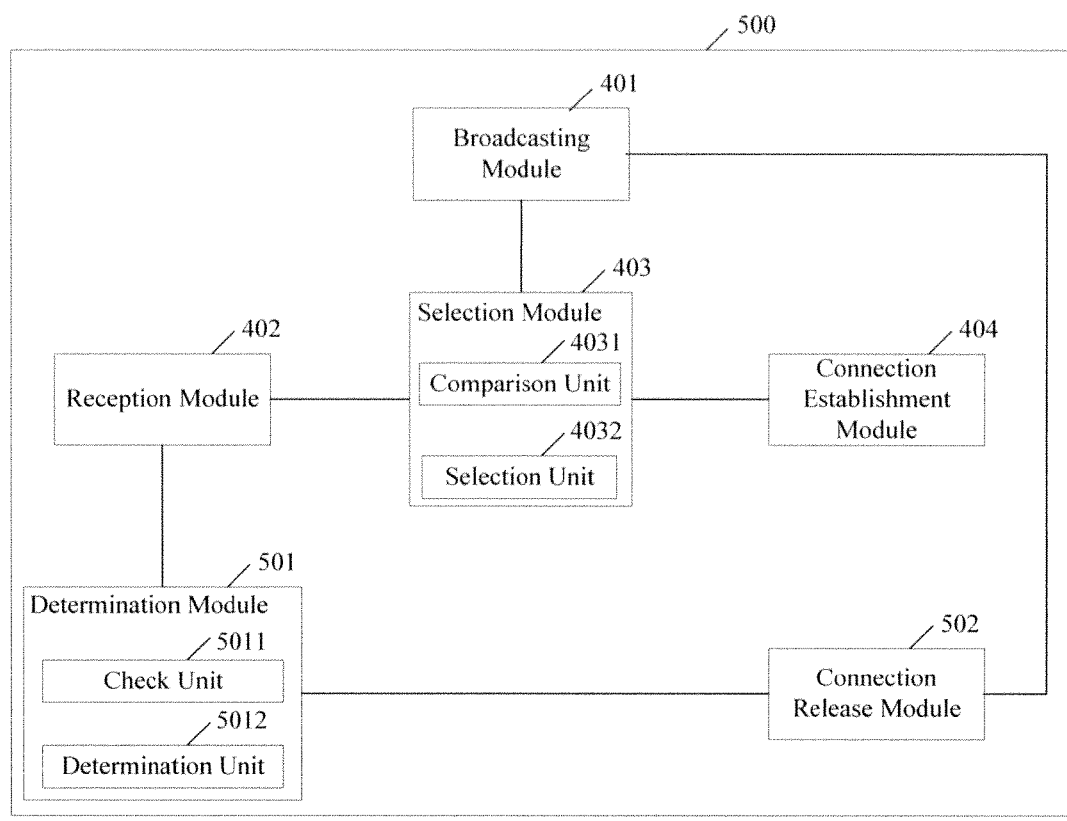
FIG. 5 is a schematic block diagram of the MTC server according to another embodiment of the present invention.

FIG. 5 shows a schematic block diagram of the MTC server 500 according to another embodiment of the present invention, wherein for the same parts as those of the previous embodiments, the same reference number will be used and the description thereof will be properly omitted. This embodiment will be described below in detail in conjunction with the figure.

As shown in FIG. 5, besides the broadcasting module 40, the reception module 402, the selection module 403 and the connection establishment module 404, the MTC server 500 of this embodiment further comprises: a determination module 501, which determines whether it is needed to establish a new session connection; and a connection release module 502, which releases the current session connection if the determination module 501 determines that it is needed to establish a new session connection.

In the MTC server 500 of this embodiment, when the session connection has been established between the MTC server 500 and the selected MTC equipment via the connection establishment module 404 and the content is received from this MTC equipment, the determination module 501 determines whether it is needed to establish a new session connection.

In the determination module 501, a check unit 5011 checks whether the content uploaded by each of the selected MTC equipments satisfies the target content request. If the check unit 5011 checks that the content uploaded by any one of the selected MTC equipments does not satisfy the target content request, a determination unit 5012 determines that it is needed to establish a new session connection.

In another embodiment, in the determination module 501, a monitoring unit monitors whether information is received from any one of the selected MTC equipments indicating that the MTC equipment is unavailable. If the monitoring unit monitors the reception of the information, a determination unit determines that it is needed to establish a new session connection.

In another embodiment, the determination module 501 may also comprise: a check unit which checks whether the content uploaded by each of the selected MTC equipments satisfies the target content request; a monitoring unit which monitors whether the information is received from any one of the selected MTC equipments indicating that the MTC equipment is unavailable; and a determination unit which determines that it is needed to establish a new session connection if the check units checks that the content uploaded by any one of the selected MTC equipments does not satisfy the target content request or if the monitoring unit monitors the reception of the unavailability information from any one of the selected MTC equipments that does not satisfy the target content request It should be noted that the MTC server 500 of this embodiment can operatively implement the communication method between the MTC server and the MTC equipments of the embodiment shown in FIG. 2.

Figure 6:
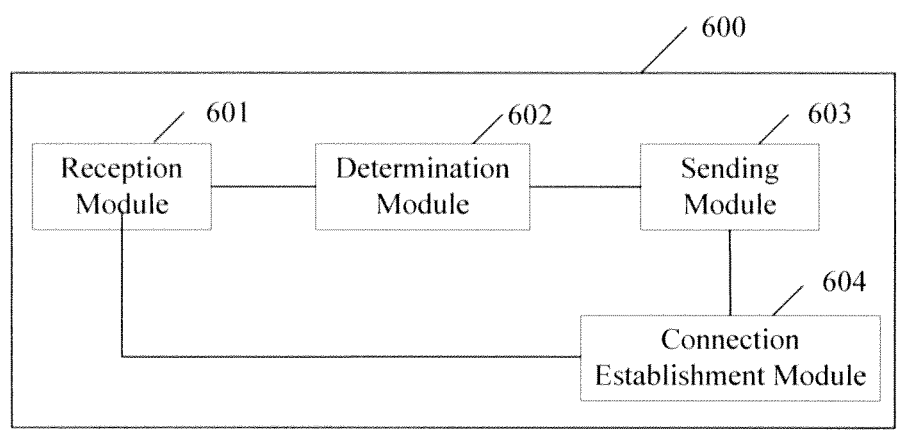
FIG. 6 is a schematic block diagram of the MTC equipment according to an embodiment of the present invention.

Under the same inventive concept, FIG. 6 is a schematic block diagram of the MTC equipment 600 according to an embodiment of the present invention. This embodiment will be described below in detail in conjunction with the figure, wherein for the same parts as those of the previous embodiments, the description will be properly omitted.

As shown in FIG. 6, the MTC equipment 600 of this embodiment can comprise: a reception module 601, which receives the target content request related to an application broadcasted by the MTC server; a determination module 602, which determines whether the MTC equipment 600 satisfies the target content request; a sending module 603, which sends availability information related to the target content of the MTC equipment 600 to the MTC server when the determination module 602 determines that the MTC equipment 600 satisfies the target content request; and a connection establishment module 604, which establishes a session connection with the MTC server in response to a session connection request from the MTC server; wherein after the session connection is established via the connection establishment module 604, the sending module 603 further uploads the content onto the MTC server.

In the MTC equipment 600 of this embodiment, the reception module 601 receives the target content request broadcasted by the MTC server over the downlink broadcast control channel. Then the determination module 602 determines whether the MTC equipment 600 satisfies the target content request. If the determination module 602 determines that the MTC equipment 600 satisfies the target content request, the sending module 603 sends the availability information of the MTC equipment 600 to the MTC server. Upon reception of a session connection request from the MTC server, the connection establishment module 604 establishes a session connection with the MTC server in response to the session connection request. After the session connection is established, the MTC equipment 600 uploads the content onto the MTC server via the sending module 603.

Further, the determination module 602 constantly determines whether the MTC equipments 600 satisfies the target content request during the MTC equipment 600 uploads the content onto the MTG server, if the determination module 602 determines that the MTG equipment 600 does not satisfy the target content request, a notification module 605 notifies the MTC server of the information indicating that the MTC equipment 600 is unavailable.

It should be noted that the MTC equipment 600 of this embodiment can operatively implement the communication method between the MTC equipment and the MTC server of the embodiment shown in FIG. 3.

In addition, the embodiment of the present invention also discloses a communication system for MTC, which comprises: the MTC server of the embodiment as shown in FIG. 4 or FIG. 5, and at least one MTC equipment the embodiment shown in FIG. 6.

It should be noted that the MTC server, the MTC equipment and their components of the above-mentioned embodiments may be implemented by hardware circuits such as large scale integrated circuits or gate arrays, semiconductors such as logic chip or transistors, or programmable hardware devices such as field programmable gate array, programmable logic device etc, or can be implemented by software executed by various types of processors, or can be implemented by a combination of the above hardware circuit and software.

Although the communication method between the MTC server and the MTC equipments of the present invention and the corresponding MTC server as well as the communication method between the MTC equipment and the MTC server and the corresponding MTC equipment are described in detail through some exemplary embodiments, these embodiments are not exhaustive, those skilled in the art can realize various changes and modifications within the spirit and scope of the invention. Therefore, the present invention is not limited to these embodiments, and the scope of the invention is only defined by the appended claims.

What is claimed is:

1. A communication method for machine-type communication (MTC) between an MTC server and MTC equipments, comprising:
broadcasting a target content request related to an application by the MTC server;
receiving, by the MTC server, availability information related to the target content from only those candidate MTC equipments which satisfy the target content request;
selecting any one or more MTC equipments from the candidate MTC equipments based on the availability information;

establishing a session connection with each of the selected MTC equipments;

receiving contents uploaded by the selected MTC equipments;

determining, by the MTC server, that it is needed to establish a new session connection when the content uploaded by any one of the selected MTC equipments does not satisfy the target content request, or upon receiving, during the content upload, unavailability notification from any one of the selected MTC equipments that does not satisfy the target content request; and when the MTC server determines that it is needed to establish a new session connection: releasing the current session connection with any MTC equipments determined to need a new session connection and executing the broadcasting step to the session connection establishment step.

2. The method according to claim 1, wherein the step of selecting any one or more MTC equipments from the candidate MTC equipments based on the availability information comprises:

comparing the availability information of the candidate MTC equipments with each other; and selecting the best MTC equipment according to a requirement of the application.

3. A communication method for machine-type communication (MTC) between an MTC equipment and an MTC server, comprising:

receiving, by the MTC equipment, a target content request related to an application broadcasted by the MTC server;

determining whether the MTC equipment satisfies the target content request;

sending availability information related to the target content to the MTC server when the MTC equipment satisfies the target content request;

establishing a session connection with the MTC server in response to a session connection request from the MTC server;

uploading content onto the MTC server;

during the uploading of the content onto the MTC server, determining whether the MTC equipment satisfies the target content request; and notifying the MTC server of information indicating that the MTC equipment is unavailable when the MTC equipment does not satisfy the target content request.

4. A machine-type communication (MTC) server for MTC, comprising one or more processors including:

broadcasting module configured to broadcast a target content request related to an application;

reception module configured to receive availability information related to the target content from candidate MTC equipments which satisfy the target content request;

selection module configured to select any one or more MTC equipments from the candidate MTC equipments based on the availability information; and connection establishment module configured to establish a session connection with each of the selected MTC equipments;

wherein the reception module is further configured to receive content uploaded by the selected MTC equipments upon the establishment of the session connection;

determination module configured to determine whether it is needed to establish a new session connection;

wherein the determination module comprises:

a check unit configured to check whether the content uploaded by each of the selected MTC equipments satisfies the target content;

a monitoring unit configured to monitor whether information is received from any one of the selected MTC equipments indicating that the MTC equipment is unavailable;

a determination unit which determines that it is needed to establish a new session connection when the check units checks that the content uploaded by any one of the selected MTC equipments does not satisfy the target content request or if the monitoring units monitors receives the unavailability information.

5. The MTC server according to claim 4, wherein the selection module comprises:

comparison unit configured to compare the availability information of the candidate MTC equipments with each other; and selection unit configured to select the best MTC equipment according to requirements of the application.

6. A machine-type communication (MTC) equipment for MTC, comprising one or more processors including:

reception module configured to receive a target content request related to an application broadcasted by the MTC server;

determination module configured to determine whether the MTC equipment satisfies the target content request;

sending module configured to send availability information related to the target content to the MTC server if the MTC equipment satisfies the target content request; and connection establishment module configured to establish a session connection with the MTC server in response to a session connection request from the MTC server;

wherein the sending module is further configured to upload content onto the MTC server upon the establishment of the session connection;

wherein the determination module is further configured to determine whether the MTC equipment satisfies the target content request during the uploading of the content onto the MTC server; and wherein the MTC equipment further comprises: notification module configured to notify the MTC server of information indicating that the MTC equipment is unavailable if the determination module determines that the MTC equipment does not satisfy the target content request.

7. A communication system for machine-type communication (MTC), comprising: the MTC server according to claim 4; and at least one MTC equipment according to claim 6.

* * * * *